(12) United States Patent
Arora et al.

(10) Patent No.: US 9,549,021 B2
(45) Date of Patent: *Jan. 17, 2017

(54) AUTOMATED TRANSITION OF CONTENT CONSUMPTION ACROSS DEVICES

(71) Applicant: Audible, Inc., Newark, NJ (US)

(72) Inventors: Ajay Arora, New York, NY (US);
Douglas S. Goldstein, Riverdale, NY (US); Douglas C. Hwang, New York, NY (US)

(73) Assignee: Audible, Inc., Newark, NJ (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/531,701

(22) Filed: Nov. 3, 2014

(65) Prior Publication Data
US 2015/0215382 A1    Jul. 30, 2015

Related U.S. Application Data

(63) Continuation of application No. 13/535,274, filed on Jun. 27, 2012, now Pat. No. 8,880,648.

(51) Int. Cl.
| | |
|---|---|
| *G06F 15/16* | (2006.01) |
| *H04L 29/08* | (2006.01) |
| *H04N 21/41* | (2011.01) |
| *H04N 21/433* | (2011.01) |
| *H04N 21/4363* | (2011.01) |
| *H04N 21/442* | (2011.01) |
| *G06K 9/00* | (2006.01) |

(Continued)

(52) U.S. Cl.
CPC .......... *H04L 67/10* (2013.01); *G06K 9/00288* (2013.01); *H04L 67/22* (2013.01); *H04L 67/306* (2013.01); *H04N 21/4126* (2013.01); *H04N 21/4333* (2013.01); *H04N 21/43637* (2013.01); *H04N 21/44227* (2013.01); *H04N 21/47202* (2013.01); *H04N 21/8455* (2013.01)

(58) Field of Classification Search
CPC ........ H04L 67/10; H04L 67/22; H04L 67/306; H04N 21/4126; H04N 21/4333; H04N 21/43637; H04N 21/44227
See application file for complete search history.

(56) References Cited

U.S. PATENT DOCUMENTS

| | | | | |
|---|---|---|---|---|
| 7,206,559 B2* | 4/2007 | Meade, II | ............... | G08C 17/02 455/151.1 |
| 8,028,320 B1* | 9/2011 | Shusterman | ....... | H04N 21/2747 725/109 |

(Continued)

*Primary Examiner* — Moustafa M Meky
(74) *Attorney, Agent, or Firm* — Knobbe, Martens, Olson & Bear, LLP

(57) ABSTRACT

Features are disclosed for transferring the presentation or playback of content from device to device. The content may include, but is not limited to, aural, video, and multimedia content. A personal device may be detected playing content. A current play position of the content can be obtained, and playback can be halted. The play position can be transferred to a media device wherein playback is automatically resumed. Additionally, the playing of content may be transferred between two or more media devices, for example in response to the movement of a user. Personal device movements and content operations may be monitored in order to determine improvements to the automatic transfer of content consumption from device to device.

22 Claims, 6 Drawing Sheets

(51) Int. Cl.
    *H04N 21/845*     (2011.01)
    *H04N 21/472*     (2011.01)

(56)             References Cited

U.S. PATENT DOCUMENTS

| | | | |
|---|---|---|---|
| 8,233,461 B1 * | 7/2012 | Debaty | H04L 41/12 |
| | | | 370/338 |
| 8,588,849 B2 * | 11/2013 | Patterson | H04M 1/72519 |
| | | | 381/380 |
| 8,606,948 B2 * | 12/2013 | Evans | G06F 9/4443 |
| | | | 709/230 |
| 8,880,648 B1 * | 11/2014 | Arora | H04N 21/4126 |
| | | | 709/218 |
| 9,215,488 B2 * | 12/2015 | Sato | H04N 5/775 |
| 2003/0071117 A1 | 4/2003 | Meade, II | |
| 2007/0047902 A1 * | 3/2007 | Ito | H04N 5/765 |
| | | | 386/231 |
| 2008/0133715 A1 | 6/2008 | Yoneda et al. | |
| 2009/0217336 A1 | 8/2009 | Chang et al. | |
| 2009/0319490 A1 * | 12/2009 | Otsu | G06F 17/30053 |
| 2011/0029597 A1 * | 2/2011 | Morinaga | H04L 65/4092 |
| | | | 709/203 |
| 2011/0091187 A1 | 4/2011 | Duffin et al. | |
| 2011/0301722 A1 | 12/2011 | Sato et al. | |
| 2012/0210343 A1 | 8/2012 | McCoy et al. | |
| 2013/0024532 A1 | 1/2013 | Lee et al. | |
| 2013/0051755 A1 | 2/2013 | Brown et al. | |

\* cited by examiner

AUTOMATED TRANSITION OF CONTENT CONSUMPTION ACROSS DEVICES

CROSS-REFERENCE TO RELATED APPLICATION

This application is a continuation of U.S. patent application Ser. No. 13/535,274, entitled AUTOMATED TRANSITION OF CONTENT CONSUMPTION ACROSS DEVICES and filed Jun. 27, 2012, the entirety of which is incorporated herein by reference.

BACKGROUND

A personal device, such as a mobile phone, media player, or tablet computer, can be used to consume content while a user of the device is travelling. The content can include aural content, such as music and audio books, or it may be rich multimedia content, such as movies, video games, and the like. Personal devices, while often mobile and efficient, may have limited functionality and content consumption capabilities, including small or low resolution displays, low quality speakers, and limited computing power. Purpose-built media devices, such as televisions, stereos, video game systems, and desktop computers provide rich content consumption experiences. The media devices can have large high definition displays, high fidelity audio processing equipment and speakers, and large amounts of computing power.

Conventionally, if a user is viewing or listening to content via a personal device, such as a mobile phone, and wants to instead consume the content on an alternate media device, the user may have to manually load the content for playback on the alternate media device, and using the alternate media device, locate the point from which to resume playback of the content based on a current play position on the personal device (e.g., by fast forwarding playback of the content on the media device until the desired play position is reached). Some personal devices allow a user to manually instruct a given personal device playing back content to stream the content to another media device, which may then output the content to the user. For example, a user listening to music via a suitably equipped MP3 player may instruct the MP3 player to stream the music to a home stereo system for output on the speakers of the stereo. In such systems the execution and playback of the content continues to originate from the personal device, and the user needs to manually instruct the personal device at the desired time of playback to stream the content to the alternate media device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
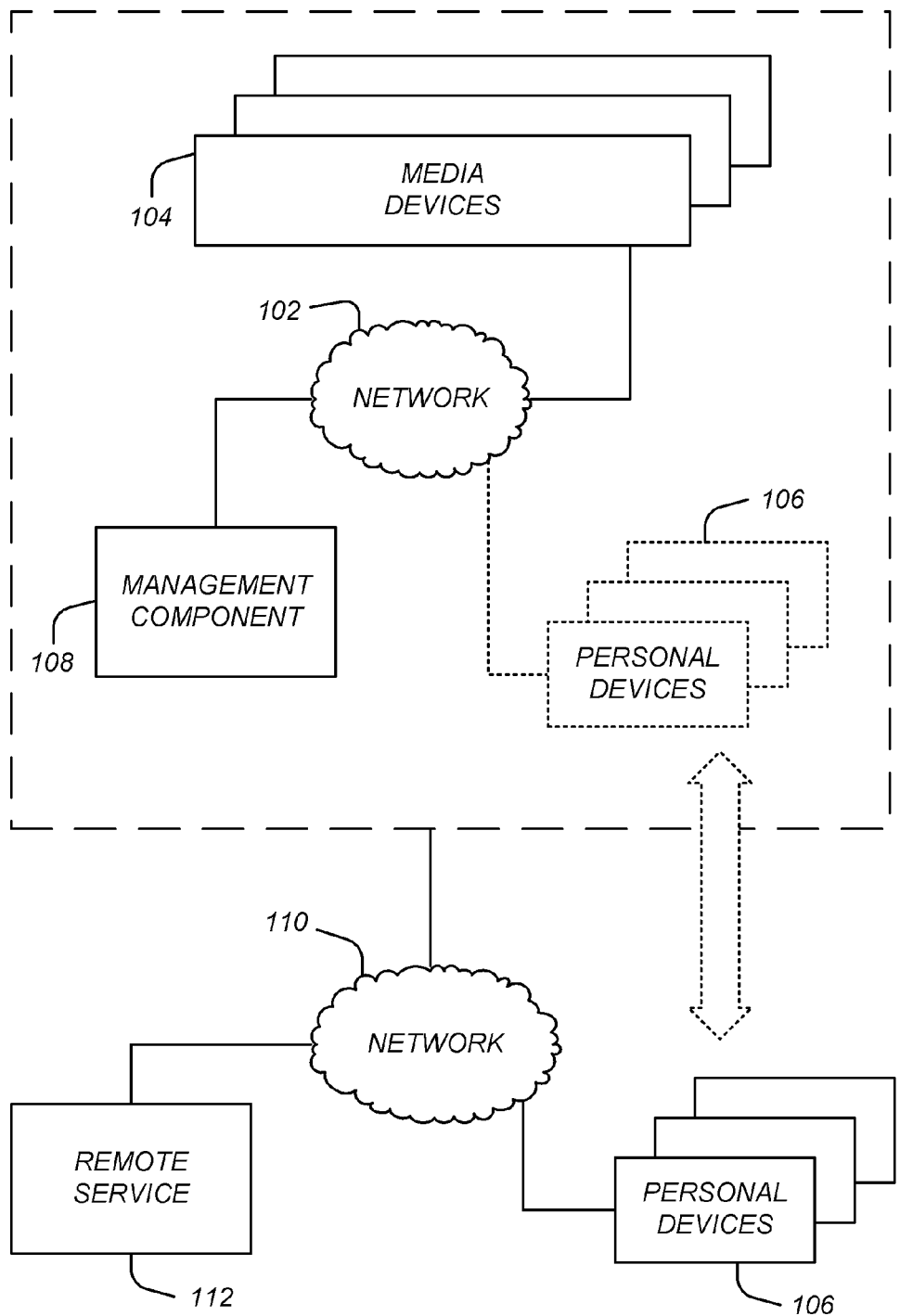
FIG. 1 is a block diagram of an illustrative networked content consumption environment including a local area network, a remote service, and multiple personal devices in communication over a network.

Generally described, the present disclosure relates to transitioning the presentation of content, including but not limited to aural, video, and multimedia content, from device to device. For example, aspects of the present disclosure relate to the detection of a mobile personal device while the mobile personal device is playing content, and the automatic transition of content presentation to another media device, such as a purpose-built device, a non-battery powered media device, and/or a more capable media device.

In some embodiments, a mobile personal device, playing or otherwise presenting content, is detected, a current play position of the content is determined (e.g., obtained from the mobile personal device or a remote service), and playback of the content by the mobile personal device is halted (although playback may be halted prior to determining the current play position). Playback of the content is, optionally at substantially the same time (e.g., within 10 seconds-5 seconds, 5 seconds-1 second, or less than 1 second), automatically resumed on an alternate media device at or approximately at the current play position.

Additional aspects of the disclosure relate to the transfer of playback between media devices. For example, a first media device may be playing content as a user moves to an area in proximity to a second media device. A current play position is obtained or determined and content playback is automatically transitioned to the second media device. The current play position may be transferred to the second media by the first media device or by an intermediary system. Further aspects of the disclosure relate to the monitoring of mobile personal device movement and usage. Data is collected and determinations are made to implement content playback transfer improvements.

Although aspects of the embodiments described in the disclosure will focus, for the purpose of illustration, on a management component detecting content playback and facilitating automated transition of content playback, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

Various aspects of the disclosure will now be described with regard to certain examples and embodiments, which are intended to illustrate but not limit the disclosure. With reference to an illustrative example, a mobile device, such as a mobile phone, may be used to consume content, such as an audio program (e.g., an audio book, music, a podcast, etc.). While a user of the mobile phone is at home, the mobile phone may be configured to connect to the user's home network (e.g., a wireless network). The user may initiate playback of the audio program while away from home, such as during the commute from work. When the user drives into a garage at home, the mobile phone may automatically connect to the user's home network. A management component of the home network can detect that the mobile phone is connected to the home network, and receive information about the playback of the audio program, including the current play position, transmitted by the mobile phone. The management component may notify the mobile phone that playback of the audio program will transfer to a home A/V (audio/video) system (e.g., a stereo or television), and in response the mobile phone may pause playback automatically. The home management component may execute within the user's home (e.g., on a home computing device) or on a remote system networked to the user's home network and/or home A/V system.

As the user enters the home, a copy of the audio program can be loaded by the home A/V system (e.g., from local memory or from a remote data store) or streamed to the home A/V system from another system, such as a system that had been streaming the audio program to the mobile phone. The A/V system playback of the content can commence from the play position obtained from the mobile phone, without requiring the user to manually instruct the mobile phone or the home A/V system to transition the playback of the content at issue. Volume and equalizer settings for the home A/V system can be loaded according to a saved configuration. The management component may detect the location of the user as the user moves from room to room. As the user moves throughout the house, playback of the program may be transferred by the management component from device to device, depending on device capabilities and user configurable preferences, so that content playback is transferred to a device physically proximate with the user (e.g., in the same room or location as the user).

The content for which playback may be transitioned from a mobile device to a media device can include, but is not limited to, audio programs, such as music and audio books, video programs, such as movies and television shows, and video games. Moreover, transition from one device to another device may allow playback of additional types of content or the offering of different features, depending on the capabilities of the devices performing the playback. For example, playback of an audio book by a mobile device, such as a mobile phone not configured for video playback or with a relatively small screen, may be limited to only the audio features of the book. However, once playback is transitioned to a media device such as a smart television, additional content may be played and/or features offered due to the additional video capabilities provided by the smart television. Examples of such additional content include the text of the book, images or video clips associated with the audio book (e.g., static images/photographs or videos of restaurants or other locations mentioned in the audio book, or of people mentioned in the book), and/or a motion picture adaptation corresponding to the audio book.

Networked Content Consumption Environment

Prior to describing embodiments of the automated transition process in detail, an example networked content consumption environment in which the process may be implemented will be described. FIG. 1 illustrates a networked content consumption environment including a network, such as local area network (LAN) 102, any number of personal devices 106, and a remote service 112. The LAN 102 may include one or more switches, routers, cable modems, ADSL modems, etc. The personal devices 106 and remote service 112 may communicate with each other and with the LAN 102 over a communication network 110, which may a wide area network. The communication network 110 may be a publicly accessible network of linked networks, possibly operated by various distinct parties, such as the Internet. In some embodiments, the communication network 110 may be a private or semi private network, such as a corporate or university intranet. The communication network 110 may include one or more wireless networks, such as a GSM network, a CDMA network, an LTE network, or other type of wireless network.

The personal devices 106 can correspond to a wide variety of electronic devices. In some embodiments, the personal devices 106 are mobile devices that include one or more processors and a memory which may contain software applications executed by the processors. The personal devices 106 may include speakers and/or displays for presenting content. In addition, the personal devices 106 may be configured with one or more wireless network antennae to facilitate wireless communication with other devices, and a global positioning system (GPS) antenna so that the personal devices 106 may be aware of their geographical locations. The personal devices 106 may also be configured to determine its location via cell tower and/or WiFi signal triangulation, cell ID information, WiFi location information, near field connections, and otherwise. Illustratively, the personal devices 106 may include mobile phones, personal digital assistants (PDAs), mobile gaming devices, media players, electronic book readers, tablet computers, laptop computers, and the like. The software of the personal devices 106 may include components for establishing communications over networks 102, 110. In addition, the software applications may include multimedia applications which play or otherwise execute audio programs such as music or audio books, video programs such as movies or television shows, and video games.

The LAN 102 may connect to media devices 104, personal devices 106, and a management component 108 in communication via a wireless link, such as a WiFi link. In such cases, the LAN 102 may be or include a wireless local area network (WLAN). Additionally, the LAN 102 may connect to the network 110, facilitating communication between various devices and components communicating over the LAN 102 and the devices and components connected to the network 110, such as the remote service 112 and other personal devices 106. In some embodiments, the components networked to the LAN 102 may communicate over a combination of wired and wireless communication links. For example, the LAN 102 may be networked to a management component 108 (which may be a single management component or may include multiple management components) in communication with several media devices 104 via a wired communication link, such as an Ethernet connection. Due to the mobile nature and wireless connectivity of many personal devices 106, the LAN 102 may network any number of personal devices 106, and the number may change over time or from minute to minute. Personal devices 106 may communicate with the management component 108 via a WiFi connection.

The media devices 104 can correspond to a wide variety of electronic devices. In some embodiments, the media devices 104 can include audio or visual output components, such as speakers or video screens. For example, the media devices 104 may include televisions, stereos, digital video recorders (DVRs), set-top boxes, desktop computers, server computers, and the like. In some embodiments, a media device 104 may also be a personal device 106, such as a mobile media player that is optionally connected to speakers or a stereo. Some media devices 104 may include one or more processors and a storage or memory which may contain software applications executed by the processors. The software of the media devices 104 may include components for establishing communications over the LAN 102 and network 110. In addition, the software applications may include multimedia applications which play or otherwise execute audio programs such as music or audio books, video programs such as movies or television shows, and video games. The storage of the media devices 104 may also contain copies of content to play on the speakers or video screens. The media devices 104 may be configured to receive and/or transmit streaming media (e.g., audio and/or video content).

The management component 108 illustrated in FIG. 1 may correspond to a computing device configured to manage content consumption among the media devices 104 and personal devices 106. For example, the management component 108 may include one or more processors and a computer storage or memory which contains software applications executed by the processors. The services provided by the management component 108 can include detecting the presence of personal devices 106 and transferring or transitioning content consumption from the personal devices 106 to the media devices 104 within the LAN 102. The management component 108 may be configured to determine and/or receive a given user's physical location and the location of media devices to thereby determine what media devices are in audible and/or visible proximity with the user. In some embodiments, the management component 108 may be coupled to or integrated into a media device 104. For example, a smart television or set-top box may include a combination of software and hardware which provide the services of the management component 108.

The remote service 112 illustrated in FIG. 1 may correspond to a logical association of one or more computing devices configured to receive information from the personal devices 106 and distribute the information to various LANs 102 and components coupled thereto. For example, the remote service 112 may communicate with the personal devices 106 while the personal devices 106 are connected to a LAN 102, and can transmit information regarding the operation of the personal devices 106 to the management component 108 of the LAN 102. In similar fashion, the management component 108 or some other component of the LAN 102 may utilize the remote service 112 to communicate with personal devices 106 which are not currently connected to the LAN 102. Optionally, the remote service 112 incorporates the functionality of the management component 108 so that the user does not have to employ user equipment to host the management component 108. In other embodiments, the remote service 112 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the networked content consumption environment may include additional or fewer components that those illustrated in FIG. 1. For example, the networked content consumption environment may include additional LANs 102 which personal devices 106 may or may not join in addition to the LAN 102 illustrated in FIG. 1. In another example, the networked content consumption environment may not include a remote service 112. In such a case, the management component 108 of the LAN 102 may collect information from the personal devices 106 in a manner similar to the remote service 112.

Example Content Presentation Transitions

Figure 2:
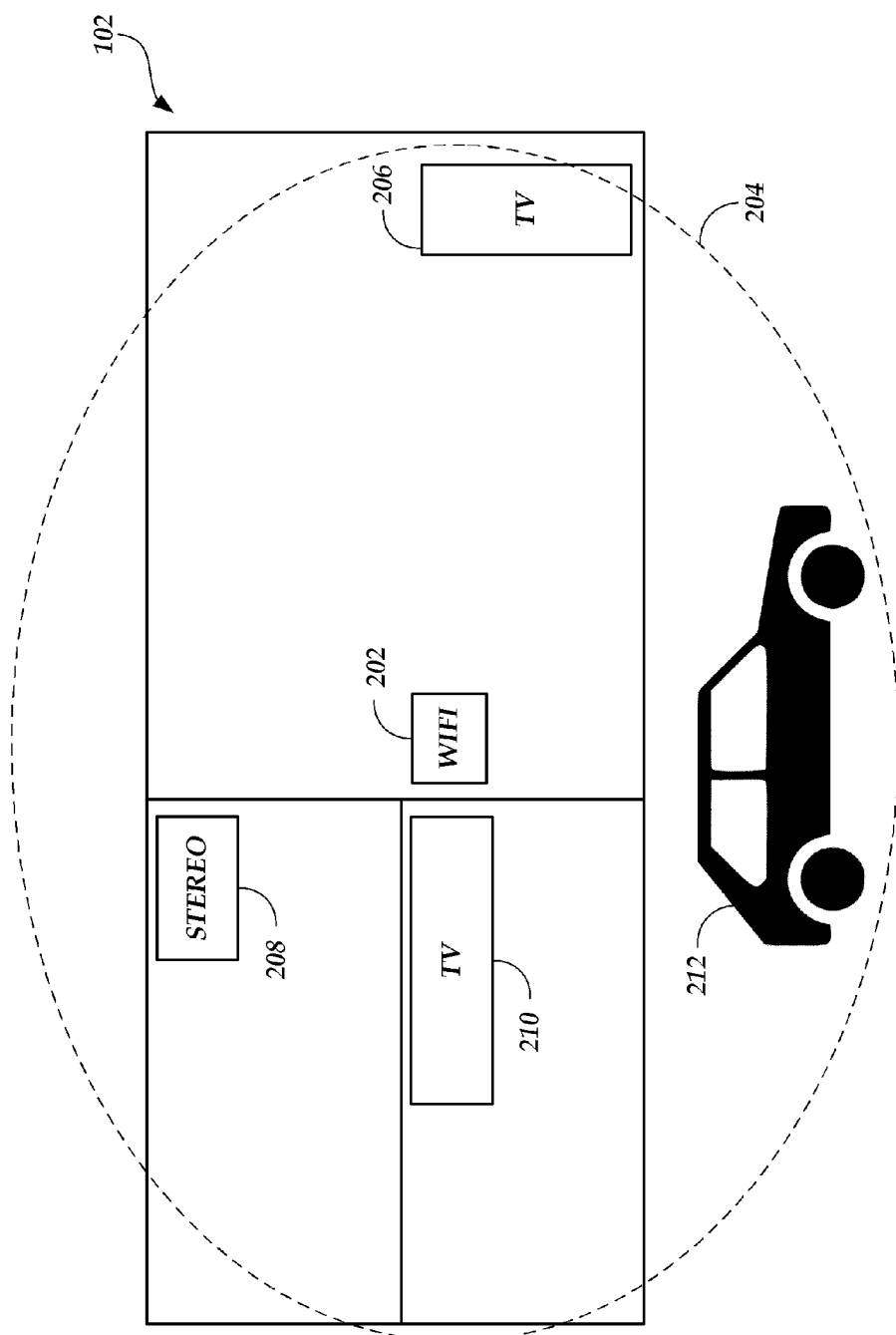
FIG. 2 is a block diagram of an illustrative local area network including several media devices.

Turning now to FIG. 2, an illustrative LAN 102 including several media devices 104 will be described. Communication among the devices of the illustrative LAN 102 of FIG. 2 is facilitated by at least one wireless (e.g., WiFi) access point 202, and therefore the LAN 102 may be a wireless local area network (WLAN). The example LAN 102 illustrated in FIG. 2 also includes several media devices: a smart television 206, a stereo 208, and a television 210. The smart television 206 is configured to perform the functions of the management component 108. In some embodiments, the LAN 102 can include additional or fewer media devices 104. For example, a LAN 102 can include fewer televisions, more stereos, or other media devices 104 not illustrated in FIG. 2, such as personal computers, video game systems, and the like. As described above with respect to FIG. 1, not every component of the LAN 102 must communicate wirelessly. For example, the stereo 208 and television 210 may communicate with the smart television 206 via a wired connection, while the WiFi access point 202 facilitates communication between each component of the LAN 102 and personal devices 106.

The access point 202 may provide a coverage area 204 that encompasses an entire building, such as a house, or some portion thereof. In some embodiments, two or more access points 202 may be used to increase the coverage area 204, reduce or eliminate dead spots, or support more concurrent personal devices 106. The access point 202 may be coupled to or otherwise in communication with a modem, such as a cable modem or digital subscriber line (DSL) modem, through which media devices 104 may communicate with devices outside of the LAN 102 via the network 110, as illustrated in FIG. 1.

In operation, a user of a personal device 106 (not pictured in FIG. 2) may set up a LAN 102 within the home as a WLAN with several media devices 206, 208, 210. The user may employ the personal device 106 to consume content while outside the home, and wish to automatically transition playback of the content to one or more of the media devices 104 after the user comes home and the personal device rejoins the LAN 102. For example, the user may listen to an audio book recording on the personal device 106. The personal device 106 may not be connected to the LAN 102 when playing of the audio book commences. The user may be listening to the audio book in a car 212 during the commute home from work. When the car 212 enters the coverage area 204 of the LAN 102, the personal device 106 may automatically connect to and join the LAN 102. The management component 108 integrated into the smart television 206 may detect that the personal device 106 has joined the network. The management component 108 may communicate with the personal device 106 and determine that the personal device 106 is currently playing an audio book. In response, the management component 108 can receive data from the personal device 106 indicating the current play position of the audio book or the management component 108 may receive current play position from another system which frequently receives current play position information from the personal device 106 (e.g., as part of a data synchronization process).

Generally speaking, a current play position or presentation position may refer to any information that reflects a current playback position of a consumed content, or to any measurement of an amount of content consumed by a user. For example, a current play position of an audio book may be indicated by a timestamp, a counter, a chapter, a last spoken word, etc., or any combination thereof. In some embodiments, a position may be reflected as a percentage (e.g., a point representing 25% of the content has been consumed). In other embodiments, a current play position may be reflected as an absolute value (e.g., at 2 hours, 30 minutes and 5 seconds into an audio book). One skilled in the art will appreciate that a current play position may be reflected by any combination of the above information, or any additional information reflective of a position of a content. In some embodiments, data regarding the current play position of the content may reflect the play position at which a device has stopped presenting content or will stop presenting the content.

If the personal device 106 is playing back streaming content from another system, the management component 108 optionally obtains the current play position from the system streaming the content. The management component 108 can then cause the personal device 106 to pause or stop playing the audio book. For example, the management component 108 may transmit a notification to the personal device 106 that playback of the audio book is transferring to the smart television 206. In response, the personal device 106 can pause or otherwise discontinue playback of the audio book.

Transfer of presentation to the smart television 206 (or any media device 104) may occur in a number of different ways. For example, after a period of time elapses, the audio book may automatically begin playing on the smart television 206. The period of time may be based on an estimate of how long it normally takes or is expected to take for the user to move from the car 212 to a listening area corresponding to the smart television 206. By way of example, the time estimate may have been previously manually entered by the user, or the time estimate may be based on previous location information collected by the management component 108 (e.g., from location information received from a cell phone carried by the user, where the management component 108 previously detected when the user entered the garage and monitored how long it took the user to reach the listening area corresponding to the smart television 206). In another example, the transfer may not occur until the personal device 106 is detected to be within a listening area corresponding to the smart television 206. For example, a GPS antenna may be used to determine the location of the personal device 106 as the user moves from the car into the home, or the personal device 106 may establish a near field connection, such as a Bluetooth connection, directly with the smart television 206 when the personal device 106 is within range of the smart television 206. Further examples are described below with respect to FIGS. 3A and 3B.

In some embodiments, the user may be prompted before playing of the audio book on the personal device 106 is paused and/or transitioned to the smart television 206. For example, the personal device 106 may be a mobile phone. An audio notification, such as a message interrupting playback of the audio book, may be given to the user. Alternatively, or in addition, a visual notification may be given, such as display of a message on the screen of the mobile phone. The notification may indicate that the personal device 106 has been detected by the management component 108, and that playback may be transferred to the smart television 206 if the user chooses. The user may choose to allow the transition, such as with a voice command or a touch screen interaction with the mobile phone. Additionally, the user may be presented with the option to select which media device 104 within the LAN 102 to transition playback of the audio book.

In some embodiments, the personal device 106 may not connect to the LAN 102 or directly communicate with the management component 108 or a media device 104. For example, referring the illustrative networked content consumption environment of FIG. 1, the personal device 106 may only communicate over the network 110 with a remote service 112. The personal device 106 may have a GPS antenna and therefore may be aware of its location within close geographic proximity to the LAN 102. The personal device 106 may be configured transmit a play position for content that it is currently playing to the remote service 112. The remote service 112 may then contact the management component 108, transferring the play position and a notification that the user will be entering the house shortly. In response to receiving such information from the remote service 112, the management component 108 can schedule content playback on the smart television 206 at the play position received from the remote service 112.

Figure 3A:
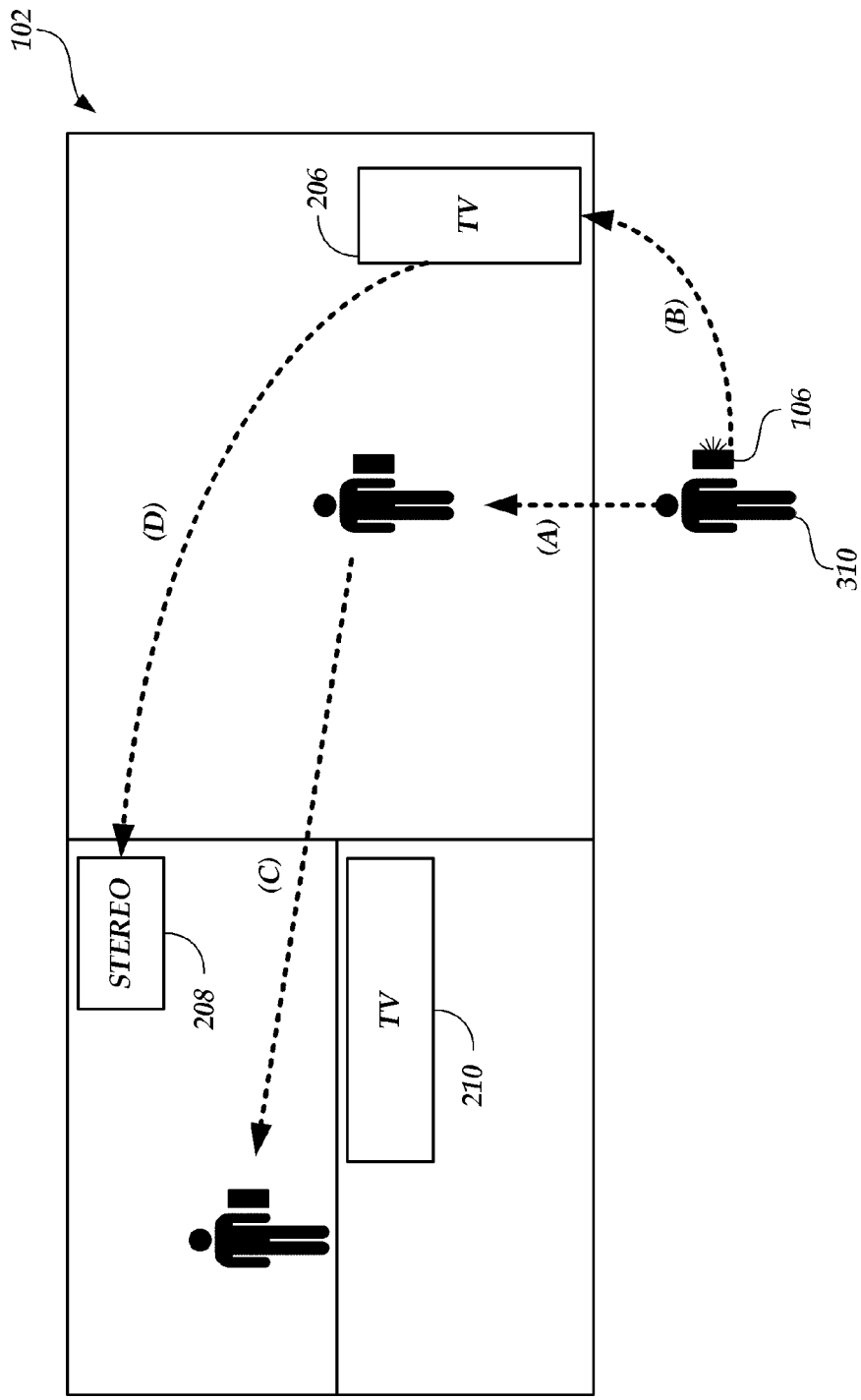
FIG. 3A is a block diagram of illustrative interactions between a personal device and various media devices, as might occur during the transfer of content playback.

Turning now to FIG. 3A, example interactions between a personal device 106 and various media devices 104 will be described. FIG. 3A illustrates the LAN 102 of FIG. 2. Illustratively, the LAN 102 is a home network including three media devices 206, 208, 210, each in a different room. As described above, the LAN 102 need not be a home network, but may instead be some other network, such as a corporate or university network.

A user 310 with a personal device 106 enters the home at (A). This may occur, for example, after the user has driven a car 212 to within the coverage area 204, as illustrated in FIG. 2. The personal device 106 may have been detected by the management component 108 integrated with the smart television 206, and in response playback of the audio book may be automatically transferred to the smart television 206 at (B).

The user 310 may next relocate to a different room of the home at (C). The management component 108 or some other component of the LAN 102, such as the media devices 206, 208 may detect the movement and transition playback at (D) of the audio book to a media device—the stereo 208—at the new location. The change in location may be based on GPS tracking of the personal device 106. Alternatively, the change may be based on near-field communication connections, such as Bluetooth connections, between the personal device 106 and the media devices 206, 208, 210. For example, the personal device 106 may have established a near field connection with the smart television 206, and that connection may be lost in response to the user relocating to a different room. At the new location, the personal device 106 may establish a new near field connection, this time with the stereo 208. In some embodiments, the near field connection may not be lost as the user relocates. In such cases, the personal device 106, management component 108, or some other component can determine which near field connection between the personal device 106 and a media device 206, 208, 210 is strongest, and therefore most likely to correspond to the media device 104 within the closest listening range of the user 310.

In some embodiments, relocation of the user 310 about the geographic area corresponding to the LAN 102 may be detected by voice recognition components. For example, the user 310 may move to a different room of the house at (C) and speak at the new location. In some cases, the spoken words may be voice commands initiating the transition of content playback to the new location at (D). The stereo 208 at the new location, or the smart television 206 at the prior location of the user 310, may be configured with a voice recognition component to receive the voice command. The voice command may be processed by the media device 206, 208, or may be transmitted to the management component 108 for processing. Alternatively, a separate microphone or voice recognition component (not pictured) may used at one or more geographic locations of the corresponding LAN 102 to receive voice commands or to recognize when a user 310 has changed location.

Optionally, the management component 108 may include or be coupled to a facial recognition system (such as may be found in a video game system), wherein various optical sensors (e.g., cameras) are placed at different locations, and the facial recognition system is configured to determine who is in their room based on facial and/or other characteristics.

Figure 3B:
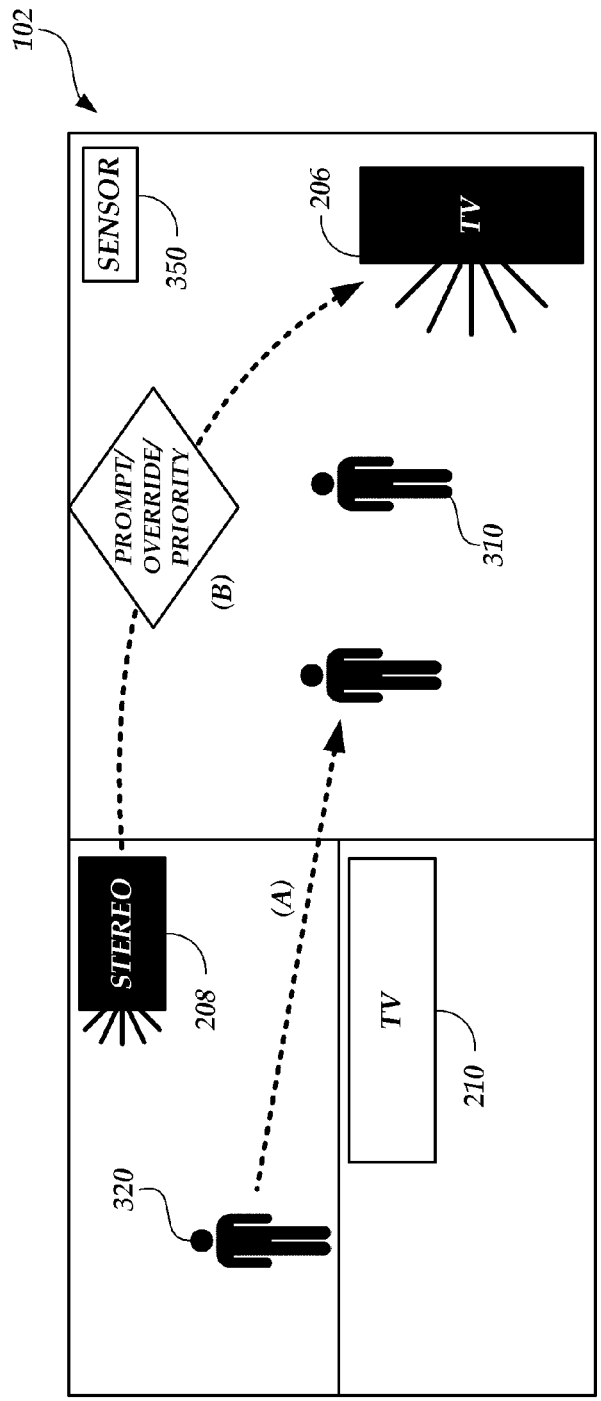
FIG. 3B is a block diagram of illustrative interactions between multiple devices in the process of playing content, and the transitions that may occur when users move from location to location.

In further embodiments a separate sensor component may be used to detect when a user 310 or a personal device 106 moves about the geographic area corresponding to the LAN 102. FIG. 3B illustrates the LAN 102 of FIGS. 2 and 3A with the addition of a sensor component 350. The sensor component 350 may be configured to communicate with or track personal devices 106 as they are moved about the geographic area corresponding to the LAN 102. For example, the sensor may receive GPS coordinates or other location information from the personal devices 106 via a wireless connection similar to the connections between personal devices 106 and media devices 104 described above.

The sensor 350 may detect the presence of a personal device 106 via a tagging and tracking system, such as a system utilizing radio frequency identification (RFID) tags integrated into each personal device 106. Several sensors 350 may be placed about the geographic location corresponding to the LAN 102 in order to detect when a personal device 106 has entered a location or left a location. For example, a sensor component 350 may be paired with each media device 104 to determine whether a personal device 106 is in close proximity to the media device 104.

Sensor components 350 may transmit updates to the management component 108 in response to determining that a personal device 106 has moved. Alternatively, the sensor component 350 can transmit updates to the management component 108 regarding the locations of personal devices 106 at regular intervals, or the sensor component 350 may be polled by the management component 108.

In addition to the use of a sensor component 350, FIG. 3B illustrates a sample conflict and resolution in cases involving a personal device 106 attempting to transition playback to a media device 104 that is already in use. As seen in FIG. 3B, a user 310 is located in a room with a smart television 206. The smart television 206 may be presenting content that was transitioned from the personal device 106 of the user 310. A second user 320 is in a second room, and content is playing on the stereo 208 in the second room. The content playing on the stereo 208 may have been transitioned from a personal device 106 of the second user 320. The second user 320 then relocates at (A) to the room with the smart television 206. The content playing on the stereo 208 may not automatically transition to the smart television 206 in response to the second user's 320 relocation if the first user 310 has priority. The priority may be, for example, priority access to a media device 104, relative priority among users 310, 320, or content-based priority. Note that the transitions described below with respect to FIG. 3B may apply to any of number of situations, including those with more than two users, and those in which the second user 320 is entering the geographic area corresponding to the LAN 102 and content will be transferred from that user's 320 personal device 106 rather than from a different media device 104.

Priority access to a media device 104 may be determined according to rules or hierarchies. For example, in FIG. 3B the first user 310 is using the smart television 206 to consume content. Therefore the first user 310 may have priority access to the smart television 206 over all potential subsequent users until the first user 310 stops using the smart television 206. In some embodiments, the first user 310 may have priority access to the smart television 206 until the occurrence of some other event or the passage of some period of time. In another example, a user profile or media device profile may be maintained by the management component 108. The profile may specify that the user 310 has priority access to the smart television 206 over all other users, or over some subset of users including the second user 320.

Relative priority among several users may be determined based on a hierarchy in which each user is assigned to a level of the hierarchy, and users of a higher level have priority over users of a lower level. The first user 310 may have priority access to any media device 104, or a subset thereof including the smart television 206, if the first user 310 is associated with a priority level or rank that is greater than the priority level or rank of the second user 320. Priority levels may be assigned and/or maintained for the various users within the management component 108.

Priority may be additionally or alternatively based on characteristics of the content. For example, if the first user 310 is listening to an audio book with mature content or explicit language, and the second user 320 is a child, the content associated with the second user 320 may be given priority and transferred to the media device 104 that is playing content associated with the first user 310, or playback of content may be stopped altogether. Content may be assigned ratings or other indicators with which such priority determinations can be made. The audio book with explicit language may be given the equivalent of an "R" rating used for motion pictures. The management component 108 may keep a profile of each user, including which content ratings each user may access or be exposed to. If the user profile associated with the second user 320 specifies that the second user 320 may not access or be exposed to content with "R" ratings, then playback of "R" rated content can automatically be stopped when a personal device 106 associated with the second user 320 enters the room or the listening/viewing range of the media device 104 on which the "R" rated content is being played.

Rather than transferring or not transferring content among personal devices 106 and media devices 104 based solely on priority rules, some embodiments may implement alternatives such as suggested resolutions, overrides, or prompts. Returning to the example above, in response to the second user 320 entering a room with a media device 104 playing "R" rated content, the management component 108 may propose a compromise instead of ending playback of the "R" rated content and/or transferring over the content of the second user 320 that was playing on a different media device 104. The management component 108 may have access to a listing of the content that each user 310, 320 has access to. The management component 108 may determine whether there is any content common to both users, such as an audio book in progress for each user, a movie that each user has watched, a song that each user has listened to more than a threshold number of times, etc. If such common content is found, the management component 108, a media device 104, or a personal device 106 may notify one or both users of the potential compromise and accept a command to initiate playback of the content on the media device 104 that is the source of the conflict. For example, if the users 310 and 320 both have access to an audio book and have recently reached similar positions within the audio book, the smart television 206 may aurally and/or visually notify the users 310, 320 of the potential compromise. Upon acceptance of the compromise, playback of the common audio book may begin near the latest position reached by either user 310, 320. Acceptance may be required of both users, of only the user with a higher relative priority ranking, of the user with priority access to the media device 104, etc.

In some embodiments, priority determinations may be overridden. Returning to the example above, the second user 320 enters a room in which "R" rated content, initiated by the first user 310, is being played on the smart television 206. The first user 310 may have a higher relative priority rank than the second user 320, or the user profile for one or both users 310, 320 may indicate that the first user 310 may override any content transfer or priority determination involving the second user 320 (e.g.: the first user 310 is the parent of the second user 320). In such cases, the first user 310 may initiate an override of the transfer or priority determination, such as by issuing a voice command or submitting a command via a personal device 106 to continue playing the "R" rated content on the smart television 206.

In some embodiments, rather than the management component 108 determining priorities and compromises, or one user initiating an override in response to potential conflicts, users may instead be prompted for a decision in response to conflicts such as the potential transfer of content associated with one user to a media device 104 currently playing content associated with another user. Returning to the example described above and illustrated in FIG. 3B, a third user (not pictured) arrives home and, typically, content playing on the third user's personal device 106 is transferred to the smart television 206. However, if the first user 310 is already using the smart television 206, the users can be prompted for a command. The options may include deciding which content to play on the smart television 206, or a listing of media devices 104 that are available to transfer playback of either content to, such as the television 210.

Content Presentation Transition Process

Figure 4:
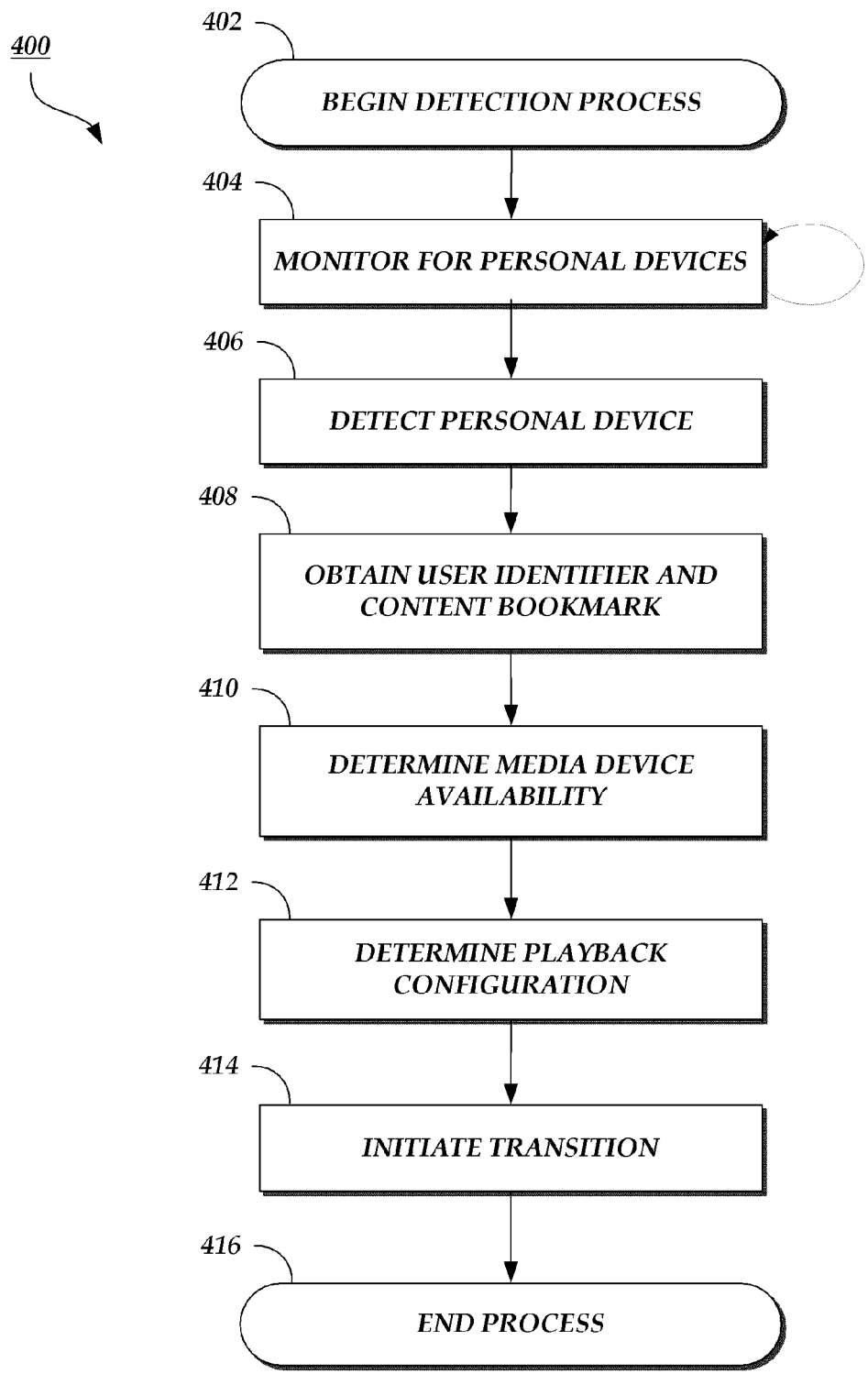
FIG. 4 is a flow diagram of an illustrative process for transferring playback of content from a personal device to a media device.

FIG. 4 illustrates a sample routine 400 for automatically transitioning content consumption from a personal device 106 to a media device 104. The routine 400 may be implemented by a management component 108 or a media device 104. The routine 400 can be implemented as a software program or collection of programs residing within non-transitory computer storage, such as RAM, ROM, a hard disk, or the like, of a computing device associated with the management component 108 or a media device 104. One or more processors of the computing device can execute the software program.

The routine 400 begins at block 402. The routine 400 may be a background process that executes continuously on a management component 108, a media device 104, or some other entity within a LAN 102. Alternatively, the routine 400 may be instantiated whenever a new personal device 106 is detected, at beginning block 406.

At block 404, the management component 108 monitors the LAN 102 for new personal devices 106. The monitoring may be passive. For example, the management component 108 may receive a notification each time a device joins or leaves the LAN 102. In some embodiments, the monitoring may be active. For example, the management component 108 may regularly attempt to contact personal devices 106 which have previously connected to the LAN 102.

At block 406, the management component 108 detects a personal device 106. The process may proceed to block 408, while the management component 108 continues to monitor for newly connected personal devices 106 at block 404.

At block 408, the management component 108 obtains an identifier and a play position or some other presentation position from the personal device 106 (or other system in communication with the personal device 106). The management component 108 may initiate retrieval of the information, or be sent the information from the personal device 106 upon joining the LAN 102. The identifier may be a unique identifier of the personal device 106, such as a media access control (MAC) address. In some embodiments, the management component 108 may receive an identifier associated with the user instead of, or in addition to, an identifier of the personal device 106. For example, the management component 108 may receive a username, account number, token, or cookie from the personal device 106 identifying the user or the personal device 106.

The play position obtained by the management component 108 may include data indicating the time that has elapsed from the start of the content playback when the playback was interrupted, a file position, a predefined chapter or page number, a frame identifier, a scene identifier, or a bookmark. In some cases, the play position may be adjusted, either before or after receipt by the management component 108. For example, the play position of an audio book can be adjusted such that some portion of the audio book will be replayed after transition to a different media device 104. This can aid in refreshing the user's memory prior to proceeding with new material.

At block 410, the management component 108 can determine media device 104 availability. As illustrated in FIG. 3A, a user may enter a house directly into a room with a media device 104. The management component 108 can determine whether that media device 104 is available to receive transition of content playback. For example, the media device 104 may already be in use, in which case priority rules may be determined and applied. In another example, the media device 104 may not be reachable, indicating a potential issue with the media device 104, the LAN 102, or the management component 108. If the originally targeted media device 104 is not available, a backup or secondary media device 104 may be chosen. The secondary media device 104 may be preselected or dynamically determined based on criteria such as the type of content (e.g.: playback of video content may not be transitioned to a stereo), proximity to the preferred media device, and which media devices 104 may be in use.

At block 412, a playback configuration can be loaded or otherwise determined for the targeted media device 104. Each media device 104, or only a subset of media devices 104, may be associated with a playback configuration. For example, the volume, equalizer settings, picture settings, and the like may all be preconfigured, and the configuration saved for future use by the management component 108. Individual users may have preferred settings for media devices 102 which may also be saved as part of their user profile or as part of a media device profile.

At block 414, the management component 108 initiates the transition of content playback from the personal device 106 to the media device 104. In some embodiments, the personal device 106 may have already ceased playback. For example, when the personal device 106 transmits a play position to the management component 108, the personal device 106 may stop playback at that time or may have already stopped playback. The play position and configuration settings can be transmitted to the media device 104, and the media device 104 can be instructed to begin playback from the play position.

The content that is played from the media device 104 may be a copy of the content from the personal device 106, the original from which a copy was made for the personal device 106, a streaming file from an application server, etc. The content is not streamed from personal device 106 to the media device 104; either an independent copy is played from a local store of the media device 104 or streamed from an application server, or the same file is streamed from an application server.

Personal Device Monitoring Process

Figure 5:
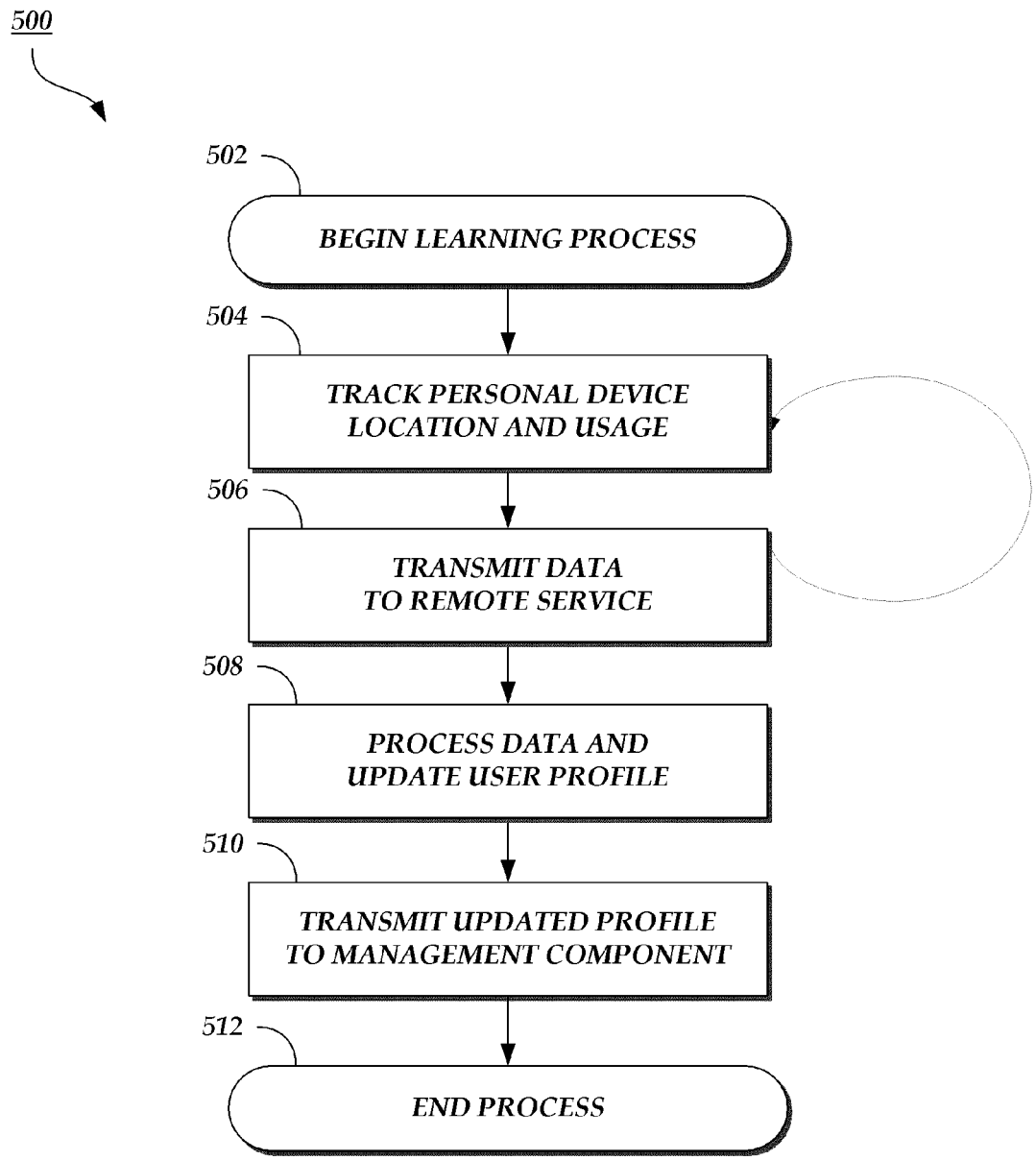
FIG. 5 is a flow diagram of an illustrative process for monitoring and determining user behaviors regarding travel and content consumption.

FIG. 5 illustrates a sample routine 500 for automated learning of user tendencies as they relate to content playback and geographic location. The routine 500 may be implemented by a personal device 106 in concert with a remote service 112 or a management component 108. The routine 500 can be implemented as a software program or collection of programs residing within non-transitory computer storage, such as RAM, ROM, a hard disk, or the like, of a computing device associated with the personal device 106, remote service 112, and/or management component 108. One or more processors of the computing device can execute the software program.

The routine 500 begins at block 502. The routine 500 may be a background process that executes continuously on a personal device 106, remote service 112, or a management component 108 Alternatively, the routine 500 may be instantiated whenever a personal device 106 leaves the LAN 102.

At block 504, the geographic movement and content playback operations of the personal device 106 may be tracked. For example, GPS coordinates may be recorded at predetermined or dynamically determined time or distance intervals, and content playback selections may be recorded. Data regarding the location and operation of the persona device 106 may be initially stored on the personal device 106, or may be permanently stored there.

At block 506, the data is transmitted to the remote service 112 or management component 108. For example, with reference to FIG. 1, the data may be transmitted to the remote service 112 via the network 110 if the personal device 106 is not connected to the LAN 102. The data may be transmitted continuously, as it is generated. In some embodiments, the data is transmitted on a regular or irregular schedule. In some embodiments, the data is transmitted in response to an event, such as each time the personal device 106 rejoins or leaves the LAN 102. The operations of blocks 504 and 506 can execute continuously, even if the process 500 proceeds to block 508.

At block 508, the data is processed to determine or update a profile for the user or the personal device 106. One item that may be included in a user profile relates to the amount of time a user takes to move between two points. GPS coordinates can be used to determine the location, direction, and speed that a user travels. From this data, the remote service 112 can detect travel patterns, such as where the user travels, when such travelling occurs, and how long each trip takes. Such data can be useful in transferring content playback from the personal device 106 to a media device 104. For example, remote service 112 can determine how long it typically takes a user to walk from the car to the home and finally into the room with the media device 104 to which playback of content is to be transferred. If the time is consistent and predictable, the management component 108 may then be able to use a timer when transferring content, such as causing the personal device 106 to stop playback when the user arrives home, and resuming playback at the smart television 206 two minutes later.

A user may have several typical destinations, which may correspond to home, work, school, and the like. The user's personal device 106 may connect to a LAN at more than one destination, and use the processes described above to transfer content playback to media devices 104 at the destinations. The amount of time it takes for the user to move from the car to the final destination may be quite long, such as when the user parks in a parking lot and walks a substantial distance to a place of business where content playback will transition to a media device 104. In these cases, playback on the personal device 106 may continue so that, for example, the user can listen to the content on a headset until the user arrives in the room or other location of the media device 104. In such cases, no timer will be used when transferring content; instead the management component 108 may wait until the user is within hearing range of the media device 104 before playback of the content is transferred.

At block 510 an updated user or device profile may be transmitted to a management component 108.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a non-transitory computer-readable memory that stores specific computer-executable instructions; and
   one or more processors in communication with the non-transitory computer-readable memory, the one or more processors configured to execute the specific computer-executable instructions to at least:
   detect a first computing device, the first computing device playing audio content;
   cause the first computing device, without user interaction, to stop playing the audio content;
   identify, in the audio content, a first stop position corresponding to execution of the instructions to cause the first computing device to stop playing the audio content;
   identify a second computing device, wherein the second computing device is different than the first computing device; and
   initiate playback, without user interaction, of the audio content at a position corresponding to the first stop position on the second computing device.

2. The system of claim 1, wherein the one or more processors configured to execute the specific computer-executable instructions to at least detect the first computing device are configured to execute the specific computer-executable instructions to at least one of:
   detect that the first computing device is connected to a wireless network;
   detect a radio frequency identifier corresponding to the first computing device;
   establish a near-field wireless connection with the first computing device; or
   detect that the first computing device has moved into a first geographic area.

3. The system of claim 1, wherein the one or more processors configured to execute the computer-executable instructions to at least identify the first stop position are configured to execute the computer-executable instructions to identify at least one of a timestamp, a counter, a chapter marker, a last spoken word, or a percentage of consumption of the audio content.

4. The system of claim 1, wherein the one or more processors configured to execute the computer-executable instructions to at least identify the first stop position are configured to execute the computer-executable instructions to:
   receive a current play position from a system streaming the audio content; and
   identify the first stop position as the current play position.

5. The system of claim 1, wherein the first stop position corresponds to one or more of:
   a portion of the audio content presented prior to execution of the specific computer-executable instructions to cause the first computing device to stop playing the audio content; or
   a portion of the audio content following the portion of the audio content presented prior to execution of the specific computer-executable instructions to cause the first computing device to stop playing the audio content.

6. The system of claim 1, wherein the one or more processors are further configured to execute the specific computer-executable instructions to at least:
   stop playing the audio content at a second stop position; and
   transmit the second stop position to the second computing device, the second computing device initiating playback of the audio content at a position corresponding to the second stop position.

7. The system of claim 6, wherein the one or more processors configured to execute the specific computer-executable instructions to identify the second computing device are configured to execute the specific computer-executable instructions to at least one of:
   detect a near-field wireless connection between the first computing device and the second computing device; or
   detect that the first computing device has moved into a second geographic area that includes the second computing device.

8. A computer-implemented method comprising:
   under control of a computing system configured with specific computer-executable instructions,
   detecting that a first computing device has stopped presenting a content item, wherein the content item includes at least one of audio data or visual data;
   obtaining a first stop position within the content item corresponding to a position at which the first computing device stopped presenting the content item;
   identifying a second computing device from a plurality of computing devices;

determining that the second computing device is available to present the content item, wherein the second computing device is different than the first computing device; and causing, without user interaction, the second computing device to initiate presentation of the content item at a position corresponding to the first stop position.

9. The computer-implemented method of claim 8 further comprising detecting the first computing device.

10. The computer-implemented method of claim 8, wherein detecting the first computing device comprises determining that the first computing device is within communication range of a wireless network.

11. The computer-implemented method of claim 8 wherein identifying the second computing device from the plurality of computing devices comprises:
  detecting that a geographic location associated with the first computing device is within a geographic area associated with at least one computing device of the plurality of computing devices; and
  identifying the at least one computing device associated with the geographic area as the second computing device.

12. The computer-implemented method of claim 8, wherein identifying the second computing device from the plurality of computing devices comprises identifying a computing device from the plurality of computing devices having a near field connection with the first computing device.

13. The computer-implemented method of claim 8, wherein identifying the second computing device from the plurality of computing devices comprises:
  associating a user profile with the first computing device;
  identifying, from the user profile, a user preference corresponding to the second computing device; and
  identifying the second computing device from the user preference.

14. The computer-implemented method of claim 8, wherein identifying the second computing device from the plurality of computing devices comprises:
  obtaining facial recognition data from an optical sensor;
  associating the facial recognition data with a user of the first computing device;
  determining that the optical sensor corresponds to at least one computing device of the plurality of computing devices; and
  identifying the at least one computing device that corresponds to the optical sensor as the second computing device.

15. A system comprising:
  a non-transitory computer-readable memory storing specific computer-executable instructions; and
  one or more processors in communication with the non-transitory computer-readable memory, the one or more processors configured to execute the specific computer-executable instructions to at least:
  detect a first computing device, wherein the first computing device is presenting a content item;
  detect that the first computing device has stopped presenting the content item;
  obtain a first stop position within the content item at which the first computing device stopped presenting the content item; and
  identify a second computing device, wherein the second computing device is different than the first computing device; and
  cause, without user interaction, the second computing device to initiate presentation of the content item at substantially the first stop position.

16. The system of claim 15, the one or more processors further configured to execute the specific computer-executable instructions to at least:
  determine location data identifying at least:
    a first geographic area and a stop time associated with the first geographic area, wherein the stop time corresponds to a time at which the first computing device stopped presenting the content item, and wherein the first geographic area corresponds to a geographic area in which the first computing device is located at the stop time; and
    a second geographic area and a restart time associated with the second geographic area, wherein the restart time corresponds to a time subsequent to the stop time, and wherein the second geographic area corresponds to a geographic area in which both the first computing device and the second computing device are located at the restart time; and
  calculate a time delay interval between the stop time and the restart time.

17. The system of claim 16, wherein the one or more processors configured to execute the computer-executable instructions to at least cause the second computing device to initiate presentation of the content item are configured to delay execution by the time delay interval between the stop time and the restart time.

18. The system of claim 16, wherein the first computing device is detected to have stopped presenting the content item at a point of origin, and wherein the one or more processors are further configured to execute the specific computer-executable instructions to at least:
  detect that the first computing device has departed from the point of origin;
  determine that the first computing device has arrived at a destination; and
  calculate a first time delay interval between a time at which the first computing device departs from the point of origin and a time at which the first computing device arrives at the destination.

19. The system of claim 18, wherein the one or more processors configured to execute the computer-executable instructions to detect that the first computing device has departed from the point of origin are configured to execute the computer-executable instructions to detect that the first computing device has disconnected from a wireless network associated with the point of origin.

20. The system of claim 18, wherein the one or more processors configured to execute the computer-executable instructions to cause the second computing device to initiate presentation of the content item are configured to delay execution by the first time delay interval.

21. The system of claim 18, wherein the one or more processors are further configured to execute the specific computer-executable instructions to at least:
  detect that the first computing device has again departed from the point of origin;
  determine that the first computing device has again arrived at the destination;
  calculate a second time delay interval between a time at which the first computing device again departed from the point of origin and a time at which the first computing device again arrives at the destination; and
  calculate an average time delay interval from the first time delay interval and the second time delay interval.

22. The system of claim 21, wherein execution of the computer-executable instructions to cause the second computing device to initiate presentation of the content item is delayed by the average time delay interval.

* * * * *